United States Patent [19]

Gorman

[11] Patent Number: 4,552,505

[45] Date of Patent: * Nov. 12, 1985

[54] INDUSTRIAL ROBOT HAVING DIRECT COAXIAL MOTOR DRIVE

[75] Inventor: Robert H. Gorman, Clinton, Pa.

[73] Assignee: American Robot Corporation, Pittsburgh, Pa.

[*] Notice: The portion of the term of this patent subsequent to Jan. 3, 2001 has been disclaimed.

[21] Appl. No.: 524,839

[22] Filed: Aug. 19, 1983

Related U.S. Application Data

[63] Continuation-in-part of Ser. No. 443,156, Nov. 19, 1982, , which is a continuation-in-part of Ser. No. 346,222, Feb. 5, 1982, Pat. No. 4,424,473.

[51] Int. Cl.⁴ .............................................. B66C 1/10
[52] U.S. Cl. ................................ 414/735; 74/665 D; 318/568; 901/15; 901/21; 901/23
[58] Field of Search .......................... 414/1, 4, 7, 735; 901/14, 15, 21-24; 74/665 A, 665 D, 469; 318/568

[56] References Cited

U.S. PATENT DOCUMENTS

| | | | |
|---|---|---|---|
| 2,459,253 | 1/1949 | Tyrner | 318/8 |
| 3,146,386 | 8/1964 | Gerber | 318/8 |
| 3,817,403 | 6/1974 | Glachet et al. | 414/735 |
| 3,922,930 | 12/1975 | Fletcher et al. | 414/1 X |
| 3,985,238 | 10/1976 | Nakura et al. | 414/735 |
| 4,062,455 | 12/1977 | Flatau | 414/735 |
| 4,068,536 | 1/1978 | Stackhouse | 74/417 |
| 4,068,763 | 1/1978 | Fletcher et al. | 414/4 |
| 4,181,465 | 1/1980 | Ridderstrom | 414/744 X |
| 4,246,661 | 1/1981 | Pinson | 3/1.1 |
| 4,289,996 | 9/1981 | Barnes et al. | 318/38 |
| 4,300,198 | 11/1981 | Davini | 364/513 |
| 4,398,110 | 8/1983 | Flinchbaugh et al. | 901/23 X |
| 4,459,898 | 7/1984 | Harjar et al. | 414/4 X |

FOREIGN PATENT DOCUMENTS

| | | |
|---|---|---|
| 0044737 | 1/1982 | European Pat. Off. . |
| 8301407 | 4/1983 | European Pat. Off. . |
| 2224349 | 11/1973 | Fed. Rep. of Germany . |
| 2228598 | 1/1974 | Fed. Rep. of Germany . |
| 2851958 | 6/1979 | Fed. Rep. of Germany ........ 901/23 |
| 2754609 | 6/1979 | Fed. Rep. of Germany . |
| 2208762 | 6/1974 | France . |
| 1266080 | 5/1981 | France . |
| 1180500 | 2/1970 | United Kingdom . |
| 2045720 | 11/1980 | United Kingdom . |
| 2058009 | 4/1981 | United Kingdom . |
| 763082 | 9/1980 | U.S.S.R. . |

OTHER PUBLICATIONS

"Ultra High Torque Motor and Driver System," 4 pages, published by Motornetics Corporation of Santa Rosa, Calif.

Primary Examiner—Robert J. Spar
Assistant Examiner—Donald W. Underwood
Attorney, Agent, or Firm—Bell, Seltzer, Park & Gibson

[57] ABSTRACT

An industrial robot is disclosed which includes three primary drive units defining three separately controlled axes of movement, and an outer arm assembly having three additional axes of movement. The three primary drive units are interconnected so that a first drive unit defines a vertical axis of movement, and the second and third drive units define horizontal axes of movement which are coaxial. Also, the three primary drive units each include an electrical stepping motor which has its rotor and stator coaxially disposed about the axis of movement, with the rotor and stator being respectively fixed to the output components, to thereby eliminate the need for any torque converting drive train between the motor and output components.

9 Claims, 4 Drawing Figures

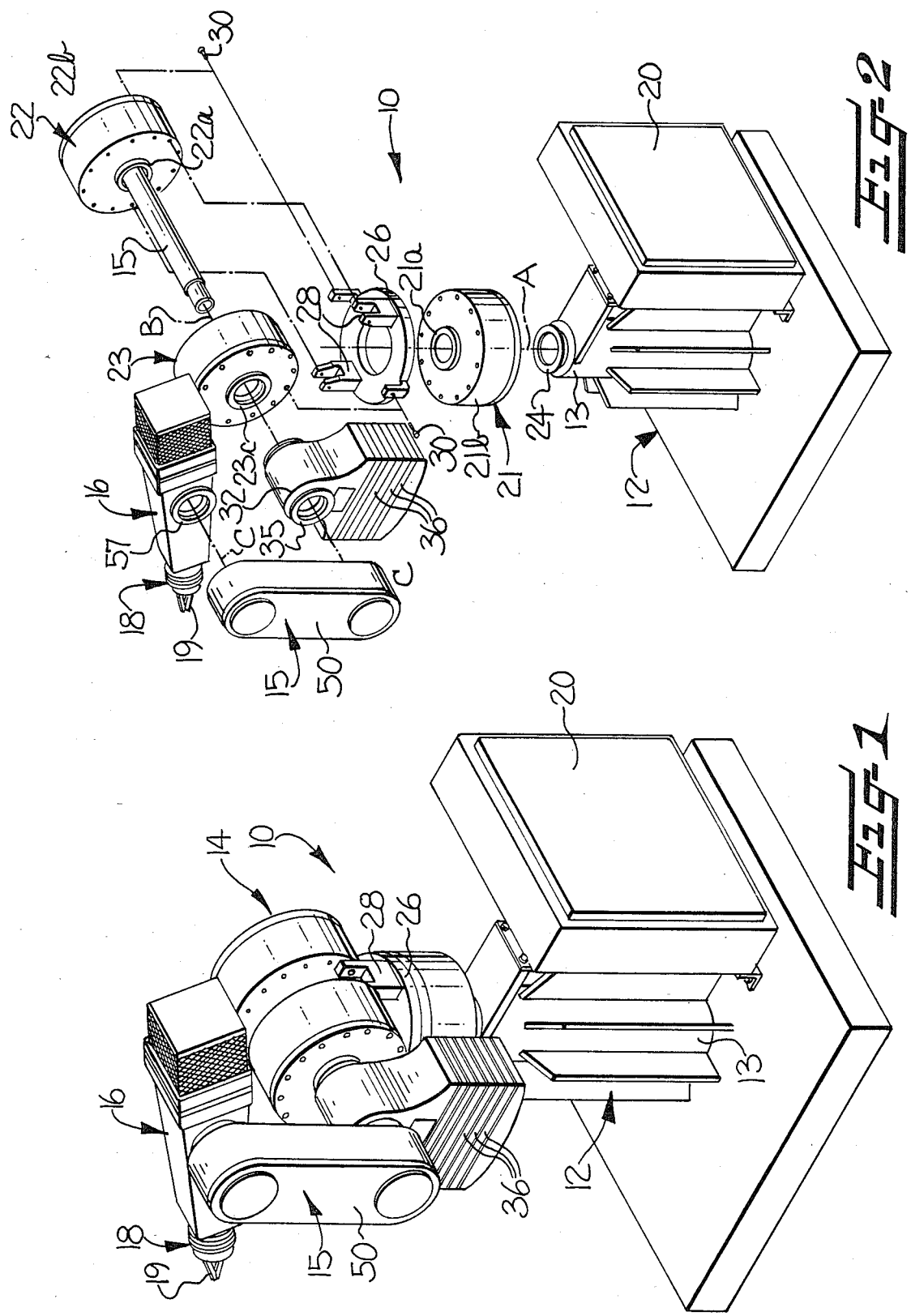

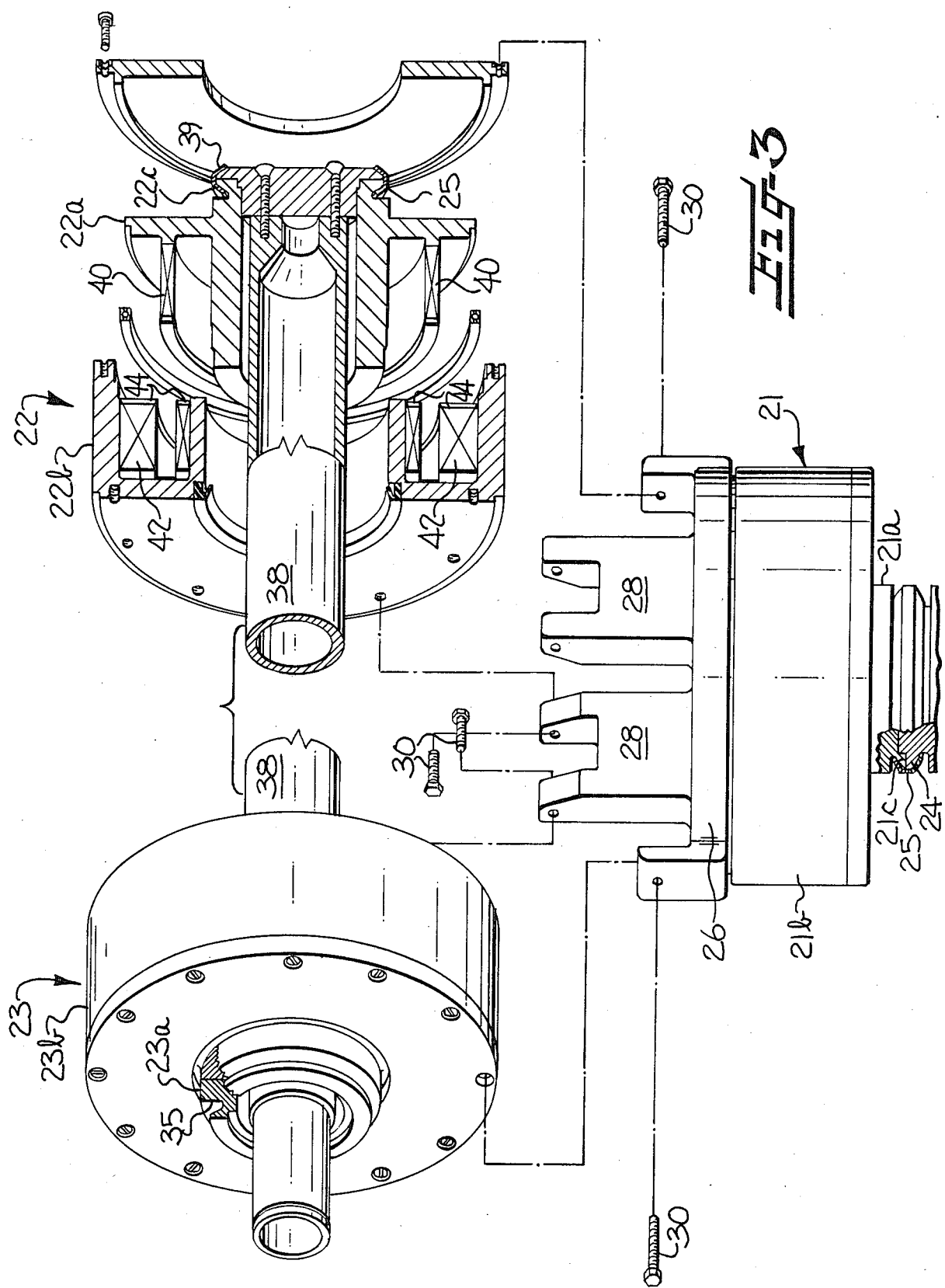

INDUSTRIAL ROBOT HAVING DIRECT COAXIAL MOTOR DRIVE

This is a continuation in part of pending application Ser. No. 443,156, filed Nov. 19, 1982, which in turn is a continuation in part of application Ser. No. 346,222, filed Feb. 5, 1982, U.S. Pat. No. 4,424,473, Fboth of which are incorporated by reference herein.

The present invention relates to an industrial robot of the type designed as a replacement for human labor in performing repetitive, hazardous, or tiring work.

Industrial robots of the described type typically have the capability of moving through six axes of movement to manipulate objects, parts, or tools through variable programmed motions for the performance of a variety of tasks. Reprogramable robots are also available which incorporate a computer and microprocessor whereby the robot may be taught to move from point to point using a portable teaching box or the like.

Conventional industrial robots of the type adapted to move through six revolute axes typically include a primary drive system which provides for movement about three primary axes, and an outer arm assembly which is adapted to move a hand assembly through three additional axes of movement. Heretofore, the drive system for each of the three primary axes of movement included a drive motor and a torque converting drive train composed of gears, drive rods, and the like. As will be apparent, such drive trains are not only expensive, but they introduce limitations on the accuracy of the movements by reason of unavoidable inaccuracies in their design and assembly, and "backlash" which is inherent in the system. Further, the drive trains require substantial alignment and assembly time during fabrication or repair, they increase the opportunity for failure resulting from wear, broken teeth or other components, and they are relatively heavy and bulky.

It is accordingly an object of the present invention to provide an industrial robot having at least three primary axes of movement, and which avoids the above noted problems associated with the known drive systems.

Additional more particular objects of the present invention include providing a drive system for an industrial robot having at least three axes of movement and which is relatively inexpensive, which may be easily assembled and aligned, which may be controlled with a high degree of accuracy, which includes a minimum number of parts which are subject to malfunction, and which is lightweight and compact in design.

These and other objects and advantages of the present invention are achieved in the embodiment illustrated herein by the provision of an industrial robot which comprises first, second, and third drive units, with each drive unit including a base component and a secondary component which is rotatably mounted with respect to the base component to define a rotational axis. The secondary components of the three drive units are fixedly mounted to each other, with the axes of rotation of the second and third drive units being coaxially aligned along an axis which preferably perpendicularly intersects the rotational axis of the first drive unit. Further, each of the drive units includes an electrical motor for relatively rotating the base component and secondary component, with each of such motors comprising a rotor disposed coaxially about the associated rotational axis and being directly fixed to one of either the associated base component or secondary component, and a stator disposed coaxially about the associated rotational axis and being directly fixed to the other of the associated base component or secondary component. Thus the drive units may be characterized by the absence of a drive train transmission between the outputs of the motors and the associated components of the drive unit.

Some of the objects having been stated, other objects and advantages will appear as the description proceeds, when taken in connection with the accompanying drawings in which FIG. 1 is a perspective view of an industrial robot which embodies, the present invention;

FIG. 2 is an exploded perspective view illustrating the components of the robot;

FIG. 3 is an exploded perspective view illustrating the second and third drive units of the robot.

Figure 4:
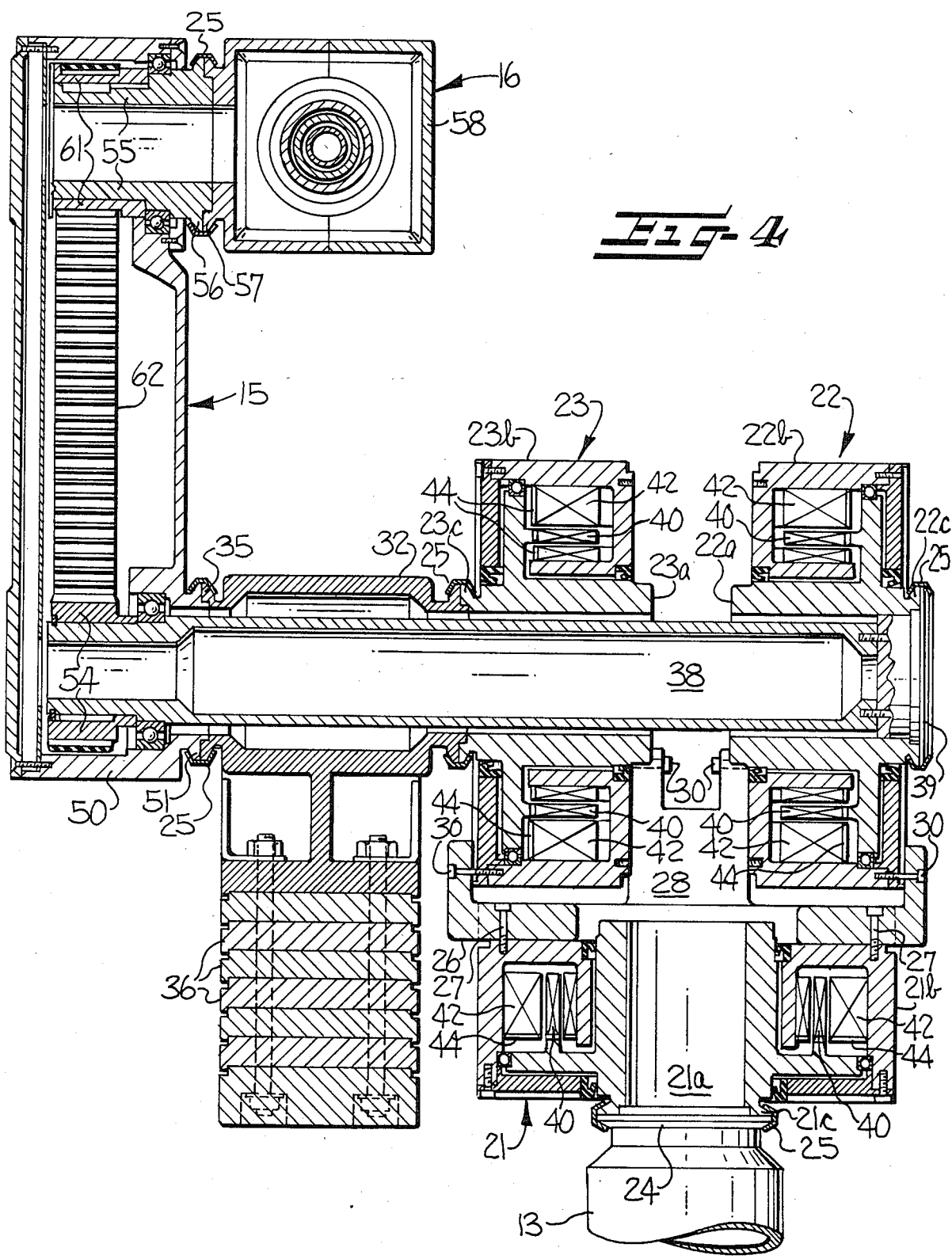
FIG. 4 is a sectional side elevation view of the robot.

Referring more particularly to the drawings, an industrial robot embodying the features of the present invention is illustrated generally at 10. In the illustrated embodiment, the robot 10 is adapted to move through six axes of movement, and it comprises a main frame 12 which includes a support stand 13, with the stand defining a generally vertical axes A. A waist 14 is rotatable with respect to the stand and defines a generally horizontal axis B which is perpendicular to and intersects the axis A. A first or inner arm 15 is rotatable with respect to the waist about the horizontal axis B, and a second or outer arm 16 is rotatable with respect to the inner arm about a second horizontal axis C, which is parallel to and laterally spaced from the axis B. A hand assembly 18 including a gripper 19 is mounted at one end of the outer arm 16, and is adapted to move through three additional axes of movement, in the manner further described in applicant's copending application Ser. No. 443,156. In addition, the main frame of the robot includes a control box 20 mounted adjacent the stand 13 for housing the electronic controls for the various drive motors of the robot.

As best seen in FIG. 4, the robot 10 further includes a first drive unit 21 having a tubular base component 21a and a secondary component 21b which is rotatable with respect to the base component about the axis A. The base component 21a is fixedly connected to the support stand 13 by releasable coupling means, which includes a circular flange 24 on the support stand, and a mating circular flange 21c integrally formed on the base component. A releaseable coupler in the form of a split band 25 of generally V-shaped configuration encloses the periphery of the mating flanges to maintain the assembly of the components. The split band 25 incorporates a conventional release mechanism for selectively opening and tightening the band circumferentially about the periphery of the abutting flanges, and so as to selectively retain the flanges in assembled relation. A split band of this type is further described in applicant's co-pending application Ser. No. 443,156.

A carriage 26 is fixed to the secondary component 21b of the first drive unit 21 by bolts 27, and the carriage includes upright parallel brackets 28 which mount a second drive unit 22 and a third drive unit 23, and which collectively form a part of the waist 14 of the robot. As will become apparent from the detailed description of the three drive units which follows, the three units are of substantially identical configuration, and this standardization greatly simplifies the design, construction, and repair of the overall apparatus, and promotes the interchangeability of parts. For present purposes, it will be seen that the second and third drive units 22, 23 each include a tubular base component 22a, 23a and a secondary component 22b, 23b which is relatively rotatable about the axis of its base component. The secondary components 22b, 23b are fixed to the brackets 28 of the carriage 26 and thus to each other by removable bolts 30 or the like, and such that the second and third drive units are coaxially disposed about the axis B. Also, the second and third drive units are disposed in opposite orientations as will be apparent from FIG. 4.

The third drive unit 23 includes output means in the form of a mounting flange 23c integrally formed at the end of the tubular base component 23a, and a tubular extension 32 which is releaseably connected to the flange 23c by means of a V-band coupler 25 of the type described above. The tubular extension 32 includes a second flange 35 at its other end for the purposes to be described. In addition, the extension mounts a number of weights 36 which serve to counterbalance the weight of the outer arm 16 during its movement about the axis B.

The second drive unit 22 includes output means in the form of a mounting flange 22c, and an elongate drive shaft 38 which extends coaxially through the base component 23a of the third drive unit and the extension 32. The drive shaft 38 includes a flange 39 at one end which is releaseably joined to the flange 22c of the base component of the second drive unit by another coupler 25.

Each of the three drive units includes drive means for relatively rotating its base component and secondary component about the associated axis of movement. For example, the drive means for the unit 21 includes an electrical stepping motor which comprises a rotor 40 disposed coaxially about the rotational axis A and which is directly fixed to the base component 21a. Further, the electrical motor includes a stator 42 which is disposed coaxially about the rotational axis A and is directly fixed to the secondary component 21b. Thus as will be apparent, the direct connection between the rotor 40 and stator 42 of the motor and the operative components of the drive unit effectively eliminates the need for any torque converting drive train between the motor and such components. The drive means for each of the other drive units 22 and 23 includes a like motor and which has its rotor and stator coaxially disposed about the axis of movement.

Electrical stepping motors of the described type are per se well known in the art and are operated by discrete electrical pulses which are fed in a sequential manner from a suitable switching control system. For every pulse fed to the motor, the motor rotates a fixed angle, and thus the number of pulses fed to the motor determines the rotational angle the motor will make. In order to obtain verification that the motor has in fact rotated, it is also common to mount a shaft encoder on the output of the motor, which senses the angular position of the motor and produces a verification signal upon each step having been taken. In the illustrated embodiment, this position sensing means takes the form of the laminate stacks 44. As one specific suitable example, a stepping motor may be utilized with the present invention which is manufactured by Motornetics Corporation of Santa Rosa, Calif., and which is designed for 125,000 pulses or steps per revolution.

The inner arm 15 of the robot comprises a casing 50, which has a mounting flange 51 at one end which is releaseably connected to the flange 35 of the extension 32 by still another coupler 25, which also conforms to the structure of the other couplers utilized on the robot. The shaft 38 from the second drive unit extends coaxially through the flange 51 of the casing, and mounts a sprocket 54 at the free end thereof.

A second shaft 55 is rotatably mounted at the other end of the casing 50, and is disposed coaxially about the horizontal axis C, which is parallel to and laterally spaced from the horizontal axis B. The shaft 55 includes an integral flange 56 which mates with a flange 57 on the casing 58 of the outer arm 16, and the two flanges are joined by a further V-band coupler 25. The second shaft 55 mounts a sprocket 61 within the casing 50 of the inner arm, and a flexible endless toothed belt 62 is operatively entrained about the sprockets. By this arrangement, the rotation of the base component 22a of the second drive unit 22 is transmitted to the outer arm 16, causing the outer arm to rotate about the axis C. Also, the rotation of the base component 23a of the third drive unit 23 is transmitted to the inner arm 15, causing the inner arm to rotate about the axis B.

In the drawings and specification, there has been set forth a preferred embodiment of the invention, and although specific terms are employed, they are used in a generic and descriptive sense only and not for purposes of limitation.

That which is claimed is:

1. An industrial robot having at least three controlled axes of movement, and characterized by the absence of a torque converting drive train in the drive units of three primary axes of movement, and comprising a support member, a first drive unit having a base component fixedly mounted to said support member, a secondary component rotatably mounted with respect to said base component to define a first axis, and drive means for relatively rotating said base component and secondary component about said first axis, a second drive unit having a base component, a secondary component rotatably mounted with respect to its base component to define a second axis, means fixedly mounting said secondary component of said second drive unit to said secondary component of said first drive unit such that the second axis is non parallel to said first axis, output means fixed to said base component of said second drive unit and aligned coaxially with said second axis, and drive means for relatively rotating said base component and secondary component of said second drive unit about said second axis, a third drive unit having a base component, a secondary component rotatably mounted with respect to its base component to define a further axis, means fixedly mounting said secondary component of said third drive unit to the secondary component of said first drive unit such that said further axis is coaxial with said second axis, output means fixed to said base component of said third drive unit and aligned coaxially with said second axis, and drive means for relatively rotating said base component and secondary component of said third drive unit about said second axis, and said drive means of each of said first, second, and third drive units comprising an electrical motor having a rotor disposed coaxially about the associated rotational axis and being fixed to one of either said base component or said secondary component thereof, and a stator disposed coaxially about the associated rotational axis and being fixed to the other of said base component or said secondary component thereof.

2. The industrial robot as defined in claim 1 wherein said first and second axes perpendicularly intersect.

3. The industrial robot as defined in claim 2 wherein said base component and output means of said third drive unit are tubular, and said output means of said second drive unit includes a shaft extending coaxially through said base component and output means of said third drive unit.

4. The industrial robot as defined in claim 3 wherein said robot further comprises
   an inner arm,
   means interconnecting said inner arm to said output means of said third drive unit,
   an outer arm,
   means pivotally connecting said outer arm to said inner arm for relative rotation about a third axis disposed parallel to and laterally spaced from said second axis, and torque transmission means operatively connecting said output means of said second drive unit to said outer arm,
   whereby said inner arm may be pivoted about said second axis by said third drive unit, and said outer arm may be pivoted about said third axis by said second drive unit.

5. The industrial robot as defined in claim 4 wherein said electrical motor of each of said first, second, and third drive units comprises a stepping motor and means for sensing the angular position of each such motor.

6. An industrial robot having a plurality of controlled axes of movement, and comprising
   a support member (26),
   a first drive unit (22) having a base component (22*a*) and a secondary component (22*b*), said base component being rotatably mounted with respect to said secondary component to define a central axis (B), means fixedly mounting said secondary component of said first drive unit to said support member, output shaft means (38) fixed to said base component and aligned coaxially with said central axis, and drive means (40, 42) for rotating said base component about said central axis, and
   a second drive unit (23) having a tubular base component (23*a*) and a secondary component (23*b*), said base component being rotatably mounted with respect to its secondary component for rotation about said central axis and being coaxially disposed about said output shaft means, means fixedly mounting said secondary component of said second drive unit to said support member, tubular output means fixed to said base component of said second drive unit and aligned coaxially about said output shaft means of said first drive unit, and drive means for rotating said base component of said second drive unit about said central axis.

7. The industrial robot as defined in claim 6 wherein said drive means of each of said first and second drive units comprises an electrical motor having a rotor (40) disposed coaxially about the central axis and being fixed to said base component thereof, and a stator (42) disposed coaxially about the central axis and being fixed to said secondary component thereof.

8. The industrial robot as defined in claim 6 wherein said robot further comprises
   an inner arm (15),
   means (32) interconnecting said inner arm to said output means of said second drive unit,
   an outer arm (16),
   means (55) pivotally connecting said outer arm to said inner arm for relative rotation about a second axis (C) disposed parallel to and laterally spaced from said central axis, and torque transmission means (62) operatively connecting said output shaft means of said first drive unit to said outer arm,
   whereby said inner arm may be pivoted about said central axis by said second drive unit, and said outer arm may be pivoted about said second axis by said first drive unit.

9. The industrial robot as defined in claim 8 wherein said drive means of each of said first and second drive units comprises an electrical motor having a rotor (40) disposed coaxially about the central axis and being fixed to said base component thereof, and a stator (42) disposed coaxially about the central axis and being fixed to said secondary component thereof, and means (44) for sensing the angular position of said rotor relative to said stator.

* * * * *

Notice of Adverse Decision in Interference -

In Interference No. 101,976, involving Patent No. 4,552,505, R. H. Gorman, INDUSTRIAL ROBOT HAVING DIRECT COAXIAL MOTOR DRIVE, final judgment adverse to the patentee was rendered Feb. 23, 1990, as to claim 7.

( *Official Gazette May 8, 1990* )